United States Patent Office 2,892,189
Patented June 23, 1959

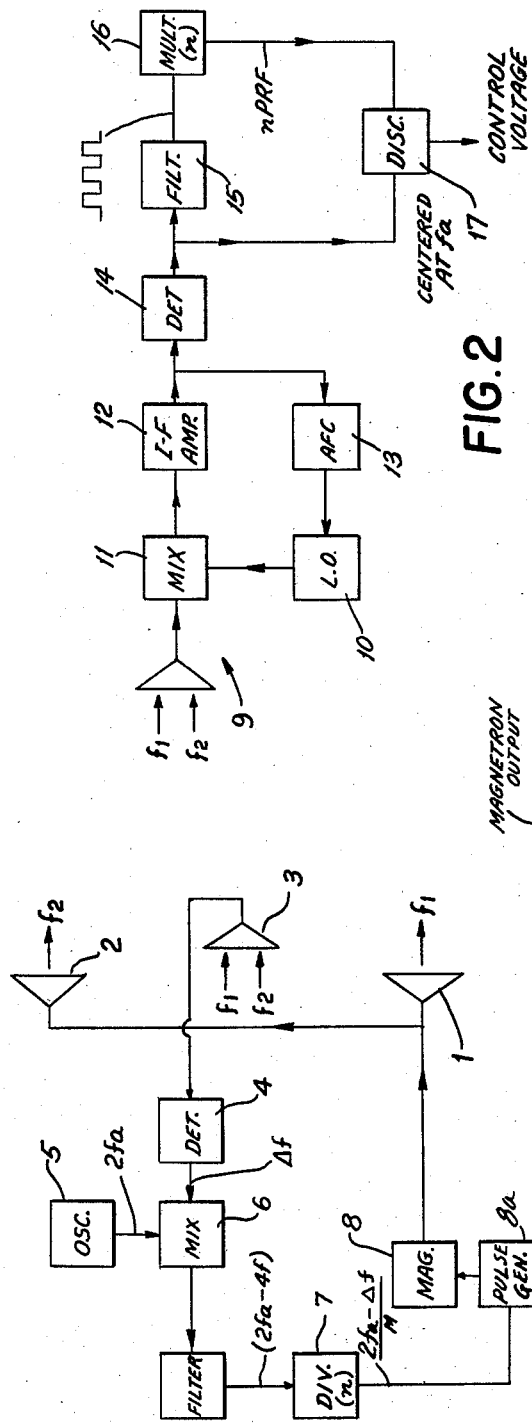
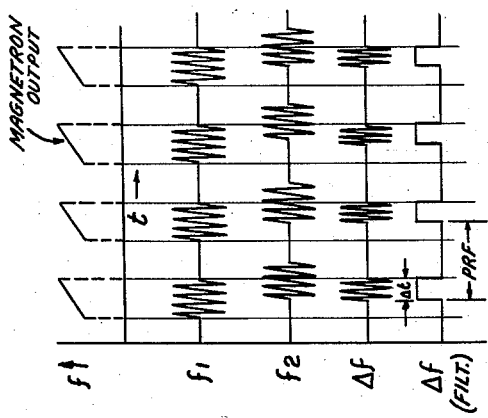
INVENTOR.
MERITT L. MILLER
BY Philip M. Bolton
ATTORNEY

2,892,189

RADIO GUIDANCE SYSTEM

Meritt L. Miller, Fort Wayne, Ind., assignor to Farnsworth Research Corporation

Application August 29, 1952, Serial No. 307,005

6 Claims. (Cl. 343—107)

This invention relates to a radio frequency guidance system, and particularly to a guidance system for remotely guiding craft along a predetermined path.

Radio guidance systems are known which employ the principles of the loran navigation system. In the loran type system, high-powered pulses are sent out from two transmitting stations with a constant known time difference maintained between the instance of departure of the pulses. Therefore, the time difference of arrival of the pulses as observed at a receiving point becomes a measure of the difference in distance of the receiving point from the two transmitters. A particular difference in distance corresponds to a receiving point located somewhere on a particular hyperbola, since a hyperbola is a curve that gives the locus of a point such that the difference in distances from any point on the curve to two fixed points is constant. In the continuous-wave system, two radiators emit continuous waves with a known and fixed time delay between them. The carrier is frequency-modulated by a sawtooth signal. Thus the second radiator will lag the first one in frequency, and the beat frequency received, at any point in space, depends on the transmission times. The shortcoming of this type system is that the information obtained is critically dependent on the precision of the sawtooth slope.

Thus, it is an object of this invention to provide a system for guiding a pilotless craft on a predetermined path, which is not critically dependent on the wave shape of the emitted signals.

The principle of operation of the present invention resides in producing interference of the two emitted signals in space. This interference takes the form of an amplitude-modulation whose frequency is a function of the difference in distance from the two emitters. Hyperbolic lines of constant beat frequency are set up by this means making guidance possible along a selected curve of a given beat frequency. The sweeps in frequency of the two signals are kept in synchronism by the use of one frequency modulated source for both signals and the introduction of different time delays between the source and its two radiators.

It is a feature of this invention to guide pilotless aircraft without employing a reference signal in addition to the two emitted signals.

In accordance with one aspect of the invention there is provided a radio guidance system of the type using a keyed transmitter which transmits a radio frequency energy regularly varying in frequency over a given frequency range from two spaced radiators. The radiators are energized by the radio frequency energy at different times whereby guiding patterns are established by lines of given frequency relationship between waves from said radiators. An arrangement is provided for assuring stability of a course line established by said system which comprises a recevier for receiving energy from the radiators at a fixed position between the radiators to produce energy of a beat frequency corresponding to the differences of frequency on the fixed line. Pulses are derived from the beat frequency of a repetition rate related to said beat frequency, and the pulses are applied to key the transmitter.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 illustrates by block diagram the circuits constituting the transmitting station of the guidance system;

Fig. 2 illustrates by block diagram the circuits constituting the receiver station of the guidance system; and Fig. 3 shows curves which are used in explaining the operation of the system.

Referring to Fig. 1, there is shown the transmitter station of the radio guidance system for guiding a craft along a predetermined path. At the transmitter station, there is located on the predetermined path, which may be the median line between a pair of radiators 1 and 2 respectively, a probe, or receiver 3. The two signals $f1$, $f2$ are of different frequencies at any instant of time, although generated by the common source 8, by virtue of the fact the carrier generated is frequency modulated by a sawtooth wave, and signal $f2$ is delayed by an amount $\Delta t$ that it takes for the signal to travel from radiator 1 to radiator 2. The signals are emitted from antennae 1, 2, respectively, and a portion of the energy is received by the probe 3, which may be a horn. The optput from the horn is applied to a horn detector 4, where the beat frequency of $f1$, $f2$ is developed. The beat frequency, illustrated as $\Delta f$ in Fig. 3, is mixed with a local oscillator frequency $2f_a$ generated by the oscillator 5. The local oscillator frequency $2f_a$ and the beat frequency $\Delta f$ are mixed in a mixer circuit 6 and applied to a frequency divider 7 where the frequency $(2f_a - \Delta f)$ is divided by a factor $n$. The resultant $$\left(\frac{2f_a - \Delta f}{n}\right)$$

represents pulses of a given repetition frequency. Since the pulses are a function of the beat frequency as detected on the predetermined path, it is desirable to use the pulse repetition frequency (PRF) as a reference quantity. The pulses produced by pulse generator 8a key magnetron 8; the magnetron having an output as illustrated in Fig. 3. The pulse repetition frequency is adjusted to a value such that $(\Delta f - f_a) - (f_a - n\text{PRF}) = 0$. As seen in Fig. 3, the magnetron produces a signal increasing in frequency with time during a pulse keying interval. When the frequencies $f1$ and $f2$ change linearly with time the difference or beat frequency, $\Delta f$, remains constant throughout the duration $\Delta t$ of the pulse.

The function of the receiver station of the guidance system located on the craft is to receive the pair of transmitted signals and to derive therefrom the reference pulses of given repetition frequency and to compare with this reference quantity the beat frequency of the signals as observed on the craft and to produce an output voltage which is representative of the departure of the craft from the path.

The pair of signals $f_1$, $f_2$ are received by a receiver 9, which may be of the superheterodyne type, comprising a conventional local oscillator 10, mixer 11, intermediate-frequency amplifier 12 and automatic frequency control circuit 13. The beat frequency $\Delta f$ is detected by an amplitude-demodulator 14. A low frequency filter 15 is provided to separate the pulse repetition frequency (PRF) from the beat frequency $\Delta f_0$; $\Delta f_0$ being the beat frequency observed on the craft. The pulse repetition frequency is then multiplied in a multiplier circuit 16 by the factor $n$. The factor $n$ of the multiplier circuit corresponds to the factor $n$ of the divider circuit at the transmitting station. The output from the multiplier circuit, $n\text{PRF}$, is applied to a discriminator 17, which is tuned to the frequency $f_a$, together with the beat frequency $\Delta f_0$. The quantities $f_a$ and $n$ are so chosen that the beat frequency $\Delta f_0$ lies above $f_a$, and $n\text{PRF}$ below $f_a$, both within the linear discriminator range. The discriminator is adjusted so that its output is an indication of $(\Delta f_0 - f_a) - (f_a - n\text{PRF})$. Therefore, the discriminator output on the craft is zero when the craft is exactly on the predetermined path, and the output will be plus or minus for a departure from the path in one or the other direction. The output from the discriminator is a control voltage which may be applied in a conventional manner to the direction controls of the craft.

The reference quantity as produced at the transmitting station is reproduced at the receiver station and applied to the discriminator as a constant reference quantity. Against this the beat frequency $\Delta f_0$ is discriminated; when the beat frequency $\Delta f_0$ is exactly the same as the beat frequency $\Delta f$ produced in the horn detector 4 which is located in the predetermined path, the discriminator output is zero. If the craft departs from the path, the beat frequency $\Delta f_0$ will change in accordance with the variations in frequency within the interval $\Delta t$, and when $\Delta f_0$ is compared with the reference quantity $n\text{PRF}$, a resultant output representative of the departure from the path is produced by the discriminator.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A radio guidance system of the type using a keyed transmitter which transmits pulses of radio frequency energy regularly varying in frequency throughout each pulse over a given frequency range, a radio frequency generator, a pulse generator coupled to the radio frequency generator to produce pulses of radio frequency energy, two spaced radiators energized by said energy at different times whereby guiding patterns are established by lines of given frequency relationship between waves from said radiators, characterized by an arrangement for assuring stability of a course line established by said system comprising a fixed receiver antenna for receiving energy from said radiators at a fixed position between said radiators, a receiver connected to said antenna to produce energy of a beat frequency corresponding to the instantaneous difference of frequency at said radiators, means for deriving said pulses from said beat frequency energy of a repetition rate related to said beat frequency, and means for applying said pulses to said transmitter to key said pulse generator.

2. The system according to claim 1, wherein said pulse producing means comprises a local oscillator and means for mixing the output of said oscillator with said beat frequency, means for dividing said mixer output to produce pulses of said given repetition frequency, said transmitter being keyed in accordance with said pulse repetition frequency.

3. A system according to claim 1, further comprising a mobile receiver for receiving said transmitted radio frequency energy, means for producing a beat frequency from said received radio frequency energy, characterized by means for deriving said keying frequency from said received energy, and means for comparing said keying frequency and said beat frequency to produce control energy indicative of degree and sense of departure of said receiver from said line.

4. In a system for guiding craft along a predetermined path comprising a source of radiant signal energy, a transmitter station for transmitting a pair of signals separated in space and time, means at said transmitter located on said path for receiving and combining said pair of signals to produce a given beat frequency, and means for producing a signal for transmission characteristic of said beat frequency, said last mentioned means comprising means for producing reference pulses of a given repetition frequency characteristic of said beat frequency, and means for applying said pulses for keying said transmitter; a receiver station located on said craft comprising means for receiving and combining said pair of signals to produce a beat frequency, and means for determining from said beat frequency the departure of said craft from said path, said means comprising means for amplitude-demodulating said beat frequency to produce said reference pulses of given repetition frequency, a discriminator tuned to produce zero output when said receiver beat frequency is equal to said given beat frequency indicating that said craft is on said path, and means for applying said receiver beat frequency and said reference pulses to said discriminator, whereby the output from said discriminator is representative of the departure of said craft from said path.

5. The system according to claim 4, wherein said pulse producing means comprises a local oscillator and means for mixing the output of said oscillator with said beat frequency, means for dividing said mixer output to produce pulses of said given repetition frequency, said transmitter being keyed in accordance with said pulse repetition frequency.

6. The system according to claim 5, wherein the local oscillator frequency is $2f_a$, the given beat frequency $\Delta f$, and the pulse repetition frequency $n\text{PRF}$, said pulse repetition frequency having a value such that $$(\Delta f - f_a) - (f_a - n\text{PRF}) = 0$$

and wherein said discriminator at the receiver station is tuned to the frequency $f_a$, and adjusted so that its output is an indication of $(\Delta f_0 - f_a) - (f_a - n\text{PRF})$, $\Delta f_0$ being the receiver beat frequency, the output being zero when $\Delta f_0 = \Delta f$.

References Cited in the file of this patent

UNITED STATES PATENTS

| | | |
|---|---|---|
| Re. 23,050 | Brunner | Nov. 23, 1948 |
| 2,472,158 | Henry | June 7, 1949 |
| 2,478,759 | Heising | Aug. 9, 1949 |
| 2,527,547 | Hardy | Oct. 31, 1950 |
| 2,682,049 | Rich | June 22, 1954 |

UNITED STATES PATENT OFFICE
CERTIFICATE OF CORRECTION

June 23, 1959

Patent No. 2,892,189

Meritt L. Miller

It is hereby certified that error appears in the printed specification of the above numbered patent requiring correction and that the said Letters Patent should read as corrected below.

Column 3, line 57, strike out "transmitter to key said pulse generator" and insert instead -- pulse generator to key said transmitter --.

Signed and sealed this 3rd day of November 1959.

(SEAL)
Attest:

KARL H. AXLINE
Attesting Officer

ROBERT C. WATSON
Commissioner of Patents